United States Patent [19]

Popp

[11] Patent Number: 4,595,207
[45] Date of Patent: Jun. 17, 1986

[54] BRUSH SEAL LABYRINTH SEALING MEANS BETWEEN TWO MACHINE PARTS

[75] Inventor: Joachim Popp, Dachau, Fed. Rep. of Germany

[73] Assignee: MTU Motoren-und Turbinen-Union Munchen GmbH, Munich, Fed. Rep. of Germany

[21] Appl. No.: 753,234

[22] Filed: Jul. 8, 1985

[51] Int. Cl.⁴ .............................................. F16J 15/447
[52] U.S. Cl. .......................................... 277/53; 277/1; 277/84; 277/95
[58] Field of Search .................................. 277/53–57, 277/1, 67, 152, 68, 227, DIG. 6, 82, 84, 95

[56] References Cited

U.S. PATENT DOCUMENTS

| 885,032 | 4/1908 | De Ferranti | 277/53 X |
| 1,651,855 | 12/1927 | Warren | 277/55 X |
| 2,654,433 | 10/1953 | Piety | 277/227 X |
| 2,878,048 | 3/1959 | Peterson | 277/227 |

FOREIGN PATENT DOCUMENTS

| 763708 | 4/1936 | France | 277/53 |
| 439367 | 12/1935 | United Kingdom | 277/53 |

Primary Examiner—Robert S. Ward
Attorney, Agent, or Firm—Roberts, Spiecens & Cohen

[57] ABSTRACT

A seal between two machine parts for sealing separate spaces at different pressure from each other comprising a brush seal extending at an acute angle to a principal axis of at least one machine part for use in spatially constricted constructions with small clearances, particularly fluid-flow engines such as airplane jet engines, for sealing rotating or stationary parts.

17 Claims, 5 Drawing Figures

BRUSH SEAL LABYRINTH SEALING MEANS BETWEEN TWO MACHINE PARTS

FIELD OF THE INVENTION

The present invention relates to a sealing means between two machine parts in which spaces at different pressure are to be sealingly separated from each other. In such machines, such as fluid flow engines, there are used labyrinths, rotating liquid rings, sliding packing rings and the like. Recently, brush seals or packings have also been proposed.

DESCRIPTION OF PRIOR ART

Such a brush seal is disclosed in German Published Application OS No. 29 21 512 which comprises a brush having bristles directed radially inwards from a brush holder. It is also known to have the brush extend radially outward from the brush holder. In principle, however, in the known arrangements sealing by means of a brush seal is achieved by two elements lying radially above one another, one of which is the brush proper and the other the abutting face of the associated part.

When radial spacing is restricted, or there are limits of tolerance or there is a complex drive possibly with several concentric shafts, which may also be relatively movable with respect to each other, the above-described radial seals cannot be accommodated or even used.

SUMMARY OF THE INVENTION

An object of the invention is to provide a method and apparatus for sealing two spaces at different pressures formed by two machine parts which, on the one hand, provides good operating and good sealing properties and, on the other hand, permits use in constructions having very limited spatial conditions.

This object is achieved by a sealing means comprising a brush seal including a holder and a plurality of bristles extending from said holder and means supporting the holder on one of the machine parts such that the seal extends at an acute angle to a principal axis of the other machine part with the bristles of the brush seal abutting against the surface of said one part perpendicularly thereto.

In further accordance with the invention, the surface of the machine part on which the holder of the brush seal is mounted forms the same angle with the principal axis as the abutting surface of said one machine part.

According to a feature of the invention, the parts may be relatively movable or stationary and in the case when the parts are movable, the principal axis represents an axis of rotation of said other machine part.

In one particular embodiment, the brush seal is arranged at least one of the end regions of a shaft and it is adapted for cooperating with the outside of an associated shaft or with the inside of such shaft if it is hollow.

The brush seal can be of annular construction and mounted on a stationary housing or on a rotating shaft.

One of the most important advantages of the invention is the possibility of using it even in the case of small clearances between two parts, particularly as regards the improved possibility for its accommodation. A further advantage is the possibility of using it even in the case of concentric shafts which turn within one another regardless of whether they rotate in the same or in opposite directions. Accordingly, the nature of the drive also plays a subordinate role. Of course, the invention is not limited to a sealing means between rotating parts but also applies to a sealing means between stationary and/or rotating parts. In this connection there can be both inner parts and outer parts and the seal can be mounted, in accordance with the invention, in an end region of one part or else be a component of one or more of said parts. A preferred field of use of the invention is for fluid-flow engines and specifically airplane jet engines, especially those which have a plurality of concentrically arranged shafts.

Several embodiments of the invention are schematically illustrated in the accompanying drawing and modifications can be effected without departing from the inventive concept.

DETAILED DESCRIPTION OF PREFERRED EMBODIMENTS

Figure 1:
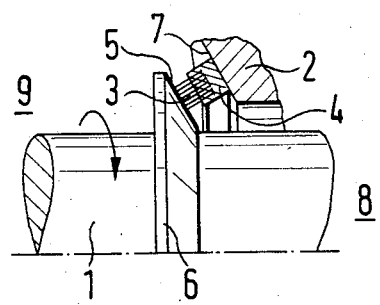
FIG. 1 shows, partly in section, a seal on a housing for sealing with a collar on a shaft.

In FIG. 1 is seen a shaft 1 which is rotatable in a housing 2 in the direction indicated by the arrow. A brush seal 3 is clamped in a holder 4 at an angle to the center line of the shaft. As seen in FIG. 1, the seal 3 extends at a sharply acute angle to the center line of the shaft of the order of about 30° or 60°, respectively, and, in general, angles of between 5° and 85° will be specially effective to achieve the objectives of the invention. The brush seal 3 extends perpendicularly to an abutting face 5 provided on a collar 6 on the shaft 1. The stationary wall 7 of the housing 2 forms the same angle with the axis of the shaft 1 as does the abutting face 5. Thereby, the free ends of bristles of the brush 3 extend perpendicularly to the face 5 and seal a space 8 i.e. a hollow space within the housing 2, from the space 9 around the collar 6.

The brush seal can be of essentially known type comprising individual bristles combined in tufts in individual holders which are arranged on holder 4 in the form of a ring which surrounds the shaft 1. Other means for fastening the bristles in their holders can also be employed.

Figure 2:
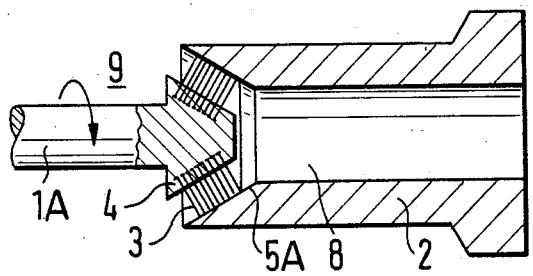
FIG. 2 shows, in section, a seal for an end region of a shaft arranged opposite a stationary housing.

FIG. 2 shows an arrangement in which elements common to those in FIG. 1 are designated by the same reference numerals and are not described in detail. In FIG. 2 is seen a shaft 1A which is rotatable with respect to housing 2 having hollow space 8. The space 8 is sealed off from space 9 of different pressure by brush seal 3 which is mounted on a frustoconical end of the shaft 1A which forms an angle with the center line of the shaft. The brush seal extends at an angle to the axis of rotation of the shaft to come into contact with the abutting face 5A on housing 2. The face 5A forms the same angle with the center line of shaft 1A (and the coincident center line of housing 2) as does the frustoconical end of the shaft. The bristles are always perpendicular to the abutting face in all embodiments.

Figure 3:
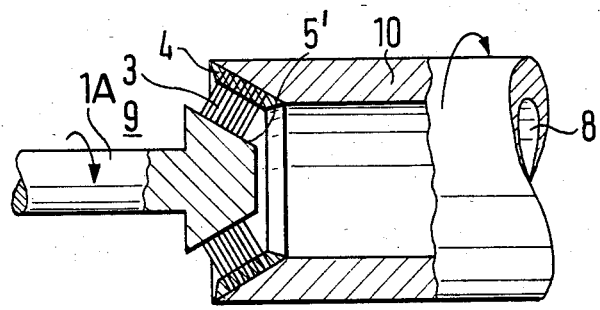
FIG. 3 shows, broken away and in section, a seal between two shafts rotating in opposite directions.

FIG. 3 differs essentially from FIG. 2 only in the manner that instead of housing 2, a rotating shaft 10 is provided which rotates opposite the direction of rotation of shaft 1A. Furthermore, the brush 3 is fastened by holder 4 to the hollow shaft 10 and the abutting face 5' is on the frustoconical end of the shaft 1A and extends perpendicular to the bristles 3 and at an angle to the center line of both shafts 1A and 10.

Figure 4:
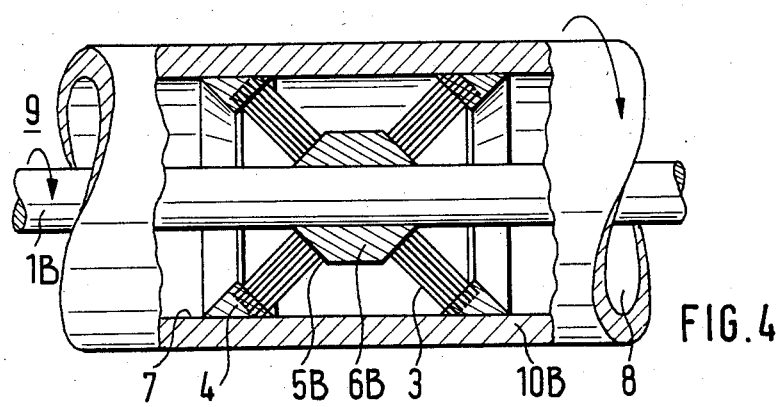
FIG. 4 shows, broken away and in section, a seal between two shafts rotating in the same direction.

FIG. 4 shows an embodiment having a shaft 1B within a hollow shaft 10B, the shafts rotating in the same direction as shown by the arrows. Brush seals 3 are mounted in holders 4 on the inside of the hollow shaft 10B so that their bristles rotate on abutting faces 5B on a collar 6B secured on the shaft 1B.

From the above, it is seen that the invention provides a brush seal which extends between two parts for the purpose of sealing separate spaces 8 and 9 at different pressures, said brush seal extending at an acute angle to the principal axis of one of the parts. The free ends of the bristles of the brush contact an abutting face of the associated part at right angles thereto. The parts can be concentrically arranged with one partially or fully inserted in the other, and in such case, the axially overlapped portions of said parts are sealed by the brush seal which extends at an acute angle to the overlapped parts whereby to minimize the radial clearance needed between the parts.

Figure 5:
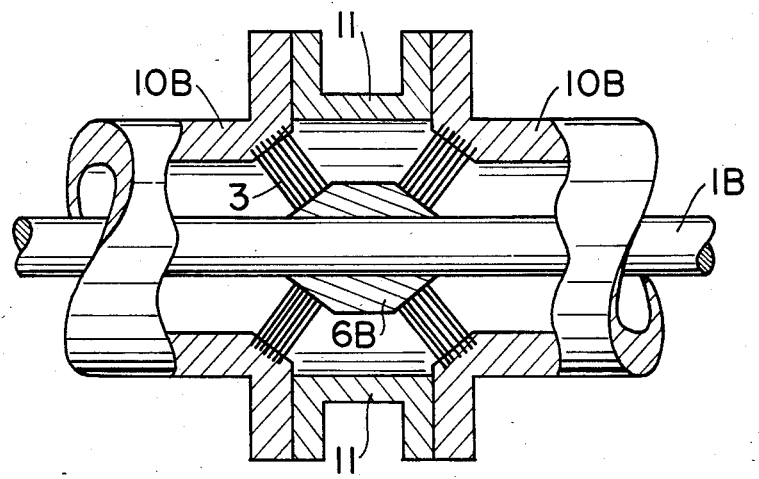
FIG. 5 shows a variation of the seal shown in FIG. 4.

In FIG. 4 the two brushes (rings) could be connected together and inserted axially or fixed to the hollow shaft 10B separately. The mounting and demounting is then easily performed when the outer shaft 10B is divided along the centerline across the axis of rotation (that is 90° thereto and in the middle of part 6B). The brushes or brush holders could also be fixed to parallel end faces or flanges with a flanged spacer 11 in between (see FIG. 5).

Although the invention has been disclosed in relation to specific embodiments thereof, it will become apparent to those skilled in the art that numerous modifications and variations can be made within the spirit and scope of the invention as defined in the attached claims.

What is claimed is:

1. Sealing means between two machine parts for sealing separate spaces at different pressures from one another, one of said machine parts having a principal axis, said sealing means comprising a brush seal including a holder and a plurality of bristles extending from said holder, and means supporting said holder on the other of said machine parts at an acute angle to said principal axis of said one machine part such that said bristles abut against a surface of the other of said machine parts perpendicularly thereto.

2. Sealing means as claimed in claim 1 wherein the surface of said other machine part forms the same angle with said principal axis as said holder does.

3. Sealing means as claimed in claim 1 wherein at least one of said parts is rotatable about said principal axis.

4. Sealing means as claimed in claim 1 wherein at least one of said parts is stationary.

5. Sealing means as claimed in claim 1 wherein at least one of said parts is movable with respect to the other of said parts relative to said principal axis.

6. Sealing means as claimed in claim 1 wherein a first of said parts comprises a shaft having opposite end regions, said brush seal being at one of said end regions.

7. Sealing means as claimed in claim 1 wherein a first of said parts comprises a hollow shaft, said brush seal being arranged at said shaft.

8. Sealing means as claimed in claim 7 wherein said brush seal is arranged within said shaft.

9. Sealing means as claimed in claim 7 wherein said brush seal is outside said shaft.

10. Sealing means as claimed in claim 1 wherein a first of said parts comprises a housing and said brush seal extends annularly on said housing.

11. Sealing means as claimed in claim 1 wherein said brush seal is stationary.

12. Sealing means as claimed in claim 11 wherein a first of said machine parts comprises a shaft surrounded by said brush seal.

13. Sealing means as claimed in claim 1 wherein said machine parts comprise respective shafts which rotate relative to one another, said brush seal being arranged between said shafts.

14. A method of sealing two separate spaces at different pressures by two machine parts which axially overlap one another, at least in part, said method comprising disposing a brush seal between overlapping facing surfaces of the axially overlapped two machine parts to seal the parts at said surfaces, securing a holder of the brush seal on one of said surfaces, the bristles of said brush seal extending from the holder perpendicularly to the other of said surfaces for contact therewith, and disposing the brush seal at an acute angle to the axis of the overlap of the machine parts whereby to minimize the clearance between the overlapped parts.

15. A method as claimed in claim 14 wherein said facing surfaces of the parts extend at an angle to the axial overlap of the parts.

16. A method as claimed in claim 15 wherein the parts have coincident axes and the brush seal is disposed at an angle to said coincident axes and is formed to extend therearound.

17. A method as claimed in claim 16 wherein at least one of said parts is rotated around said coincident axes.

* * * * *